United States Patent [19]
Watanabe et al.

[11] Patent Number: 5,291,306
[45] Date of Patent: Mar. 1, 1994

[54] IMAGE REPRODUCING APPARATUS

[75] Inventors: Ikuo Watanabe, Kawasaki; Yasutomo Suzuki, Yokohama, both of Japan

[73] Assignee: Canon Kabushiki Kaisha, Tokyo, Japan

[21] Appl. No.: 25,830

[22] Filed: Mar. 3, 1993

Related U.S. Application Data

[63] Continuation of Ser. No. 585,736, Sep. 20, 1990, abandoned.

[30] Foreign Application Priority Data

Sep. 25, 1989 [JP] Japan ................................. 1-248757
Sep. 13, 1990 [JP] Japan ................................. 2-245715

[51] Int. Cl.$^5$ ............................................... H04N 1/00
[52] U.S. Cl. ....................................... 358/444; 358/468
[58] Field of Search .............. 358/401, 404, 432, 444, 358/468; H04N 1/00

[56] References Cited

U.S. PATENT DOCUMENTS 5,019,916  5/1991  Ogura .................................. 358/401

Primary Examiner—Mark R. Powell
Attorney, Agent, or Firm—Robin, Blecker, Daley & Driscoll

[57] ABSTRACT

A reproducing apparatus has a memory for storing compressed image data; a unit for supplying the stored data to a reproducing unit for reproducing the stored data as a visual image; and a unit for causing the memory to retain the compressed image data irrespective of the operation of the supplying unit.

14 Claims, 9 Drawing Sheets

IMAGE REPRODUCING APPARATUS

This is a continuation application under 37 CFR 1.62 of prior application Ser. No. 585,736, filed Sep. 20, 1990 now abandoned.

BACKGROUND OF THE INVENTION

2. Field of the Invention

This invention relates to an image reproducing apparatus.

2. Related Background Art

As recent standards of television broadcasting, in addition to a conventional NTSC system having an aspect ratio of 3:4 and 525 scan lines, there has been proposed a more precise television system such as an HDTV system having an aspect ratio of 9:16 and 1125 scan lines which system is intended to be used in practice. This HDTV system has image information about five times as much as the NTSC system, and the screen is wide. Thus, fine and outstanding images can be obtained.

The amount of information is great so that it is impossible to transmit the information as it is to each house, because of restrictions of broadcasting waves and communication capacity. Therefore, image information is transmitted while using a so-called distribution quality lower than the original image quality at a studio (i.e., having a narrower bandwidth), and also compressing the bandwidth. Table 1 shows examples of various factors of studio quality and distribution quality of the HDTV system.

Moving images of the HDTV at each house are essentially limited to the distribution quality.

Apart from the above, since the HDTV system uses a larger number of scan lines and has fine images with less flicker, not only moving images but also still images are fine and outstanding, leaving possible applications to arts, culture, education, animation and other fields. In general, television viewers look at a single still image for several seconds to ten and several seconds so that the quality of a still image is desired to have the studio quality.

Figure 7:
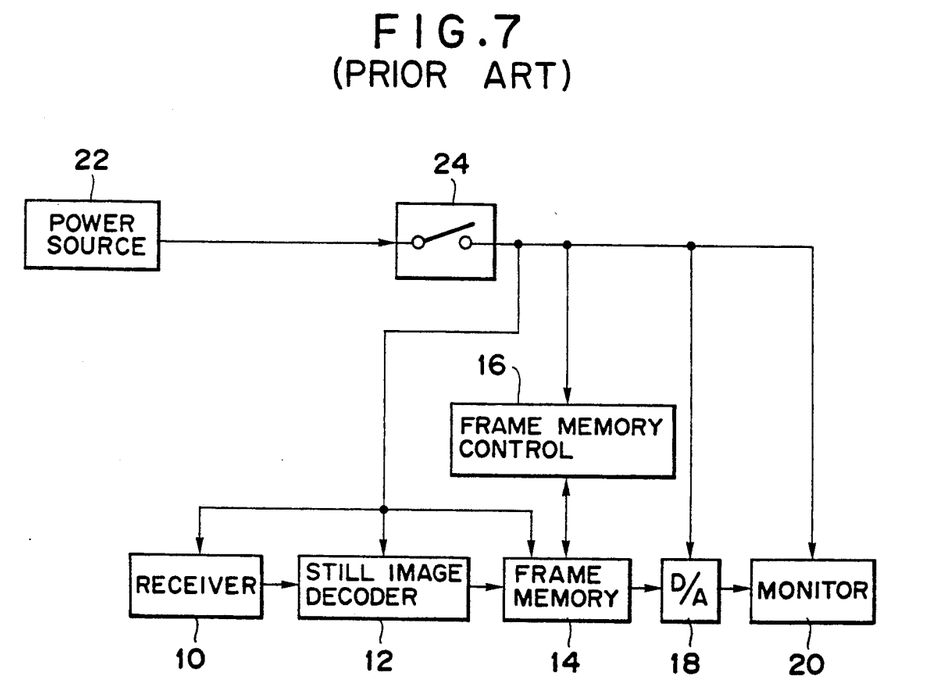
FIG. 7 is a block diagram showing a conventional apparatus.

In this regard, in addition to an HDTV moving image transmission/reception (reproduction) apparatus, an HDTV still image transmission/reception (reproduction) apparatus has been proposed. FIG. 7 is a block diagram showing the structure of a still image receiving apparatus. A receiver 10 receives a broadcasting wave from an antenna and derives therefrom a bandwidth-compressed still image information signal. A still image decoder 12 decodes the compressed still image signal outputted from the receiver 10 and expands its bandwidth to thereby output original still image data. The image data outputted from the decoder 12 is developed and stored as a still image in a frame memory 14 under control of a frame memory controller 16. After the necessary image data is stored in the frame memory 14, the frame memory controller 16 reads the stored data at a faster scan rate. The read data is converted into an analog signal by a D/A converter 18, and applied to a monitor 20 which then displays the received image.

An output from a power source 22 is connected via a power source switch 24 to the receiver 10, decoder 12, frame memory 14, frame memory controller 16, D/A converter 18, and monitor 20. When the power source switch 24 is turned off, the circuits 10 to 20 becomes inactive.

TABLE 1

|  | Studio Quality | Distribution Quality |
|---|---|---|
| Scan Lines | 1125 lines | 1125 lines |
| Brightness (Y) | 30 MHz | 20 MHz |
| Brightness Sampling Frequency | 74.25 MHz | 48.6 MHz |
| Color Difference Bandwidth (Pr, Pb) | 15 MHz | 7 MHz |
| Color Difference Sampling Frequency | 33.125 MHz | 16.2 MHz |

With the conventional apparatus shown in FIG. 7, if still images are transmitted at a relatively long interval (e.g., several ten seconds), a still image may not be displayed on a monitor for a long time after the power source switch is turned on.

If power is always supplied at least to the circuits 10, 12 and 16, a broadcast image can be displayed on the monitor 20 immediately after the power source switch is turned on. Such arrangement is however not practical because of a large power consumption by the decoder 12 and frame memory.

If the power source switch is to be manually turned on or off, it must be turned on before a still image data is transmitted and turned off after the end of broadcasting, requiring cumbersome user activity. In addition, turning on or off the power source switch may be inadvertently missed. If the apparatus is maintained by being turned on for a long period without noticing it, the apparatus may become overheated and dangerous.

SUMMARY OF THE INVENTION

It is an object of the present invention to provide an image reproducing apparatus capable of eliminating some or all of the above-described problems.

It is another object of the present invention to provide a still image reproducing apparatus having a relatively small power consumption while the main power is turned off and capable of displaying a still image in a relatively short time after the main power is turned on.

It is a further object of the present invention to provide an image reproducing apparatus capable of updating and retaining the latest image even while the main power is turned off.

According to a preferred embodiment of this invention achieving the above objects, an image reproducing apparatus is disclosed. Namely, power is always supplied to an input circuit including memory means in which bandwidth-compressed still image information is stored. The input bandwidth-compressed still image information is always maintained by being stored in the memory means so that it is not necessary to wait for a data input necessary for image reproduction after the main power is supplied. Thus, a reproduced image can be displayed in a short time. Furthermore, there is only a small power consumption by the memory means of a relatively small capacity and operating at a low speed.

The above and other objects and advantages of the present invention will become apparent from the following embodiments and accompanying drawings.

DETAILED DESCRIPTION OF THE PREFERRED EMBODIMENTS

The embodiments of this invention will be described with reference to the accompanying drawings.

Figure 1:
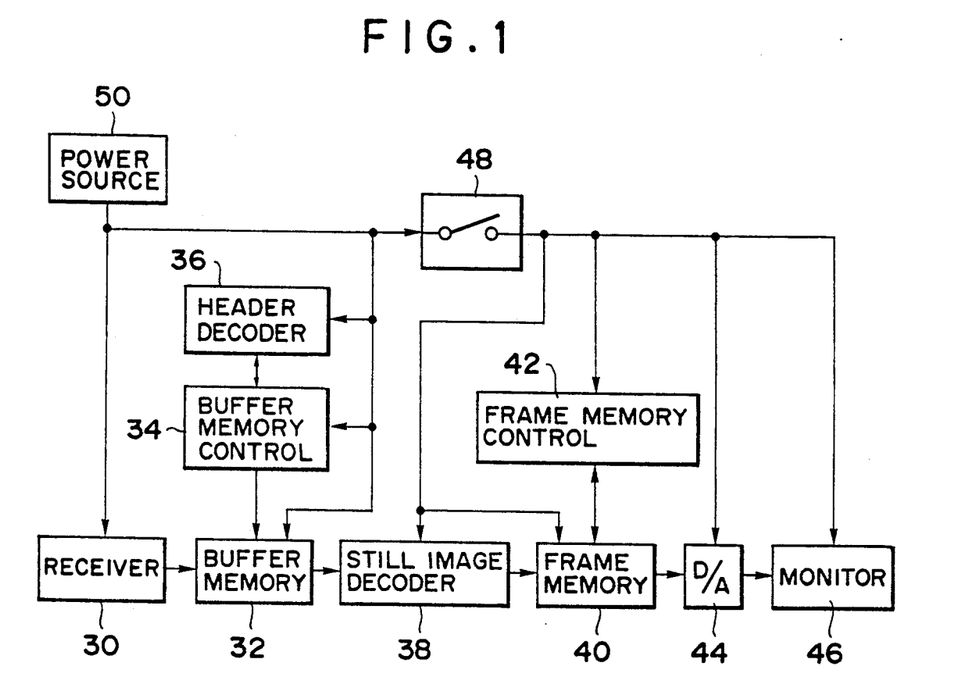
FIG. 1 is a block diagram showing the structure of a first embodiment of this invention.

FIG. 1 is a block diagram showing the structure of an embodiment of this invention. Reference numeral 30 represents a receiver similar to the receiver 10, 32 a buffer memory for storing compressed still image information of at least one frame, 34 a buffer memory controller for controlling the buffer memory 32, 36 a header decoder for recognizing and analyzing a header of received data, 38 a still image decoder similar to the decoder 12, 40 a frame memory, 42 a frame memory controller, 44 a D/A converter, 46 a monitor, 48 a power switch operated by user, and 50 a power source such as a commercial a.c. power source.

The power source 50 always supplies power to the receiver 30, buffer memory 32, buffer memory controller 34, and header decoder 36, and also supplies power via the power source switch 48 to the still image decoder 38, frame memory 40, frame memory controller 42, D/A converter 44, and monitor 46.

Next, the description will be given for the operation while the power source switch 48 is turned off. Even while the power source switch 48 is turned off, power is supplied to the receiver 30, buffer memory 32, buffer memory controller 34, and header decoder 36. This circuit portion may be constructed of, e.g., CMOS logic circuits because this circuit portion is allowed to operate at a relatively low speed. Furthermore, the capacity of the buffer memory 32 is small so that even if power is always supplied to this circuit portion, the power consumption can be suppressed to a very small value.

Figure 2:
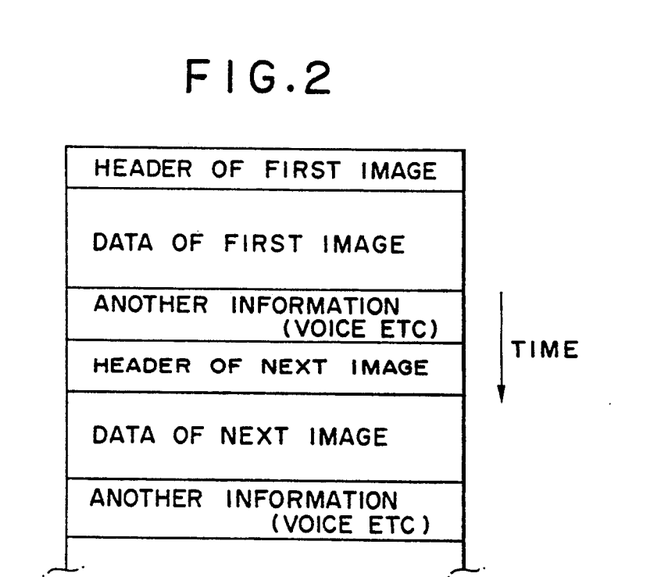
FIG. 2 shows a format of signals outputted from a receiver 30.

The receiver 30 outputs received data time sequentially in the manner as shown in FIG. 2. The header decoder 36 recognizes and analyzes a header to thereby identify the length of still image information, i.e., the data amount. In accordance with this identification, the buffer memory controller 34 causes the buffer memory 32 to store compressed image information of the latest one frame.

In order to allow a quick operation of the monitor 46 when the power source switch 48 is turned on, power may be arranged to be supplied to a CRT pre-heater circuit of the monitor 46 for pre-heating the CRT while the power source switch 48 is turned off.

When the power source switch 48 is turned on under the above conditions, the buffer memory controller 34 causes the stored data in the buffer memory 32 to be supplied to the decoder 38 which then decodes and develops it into the frame memory 40. Thereafter, in the similar manner as the conventional apparatus, a still image is displayed on the monitor 46. In this embodiment, it is not necessary to wait for a reception of image data so that a still image is displayed on the monitor 46 at once.

While the power source switch 48 is turned on, the buffer memory 32 may be used as a FIFO buffer for matching the output timing of the receiver 30 with the input timing of the decoder 38. It is obvious that an output from the receiver 30 may be directly supplied to the decoder 38, by-passing the buffer memory 32. In the former case, it is advantageous in that the processing speed at the decoder 38 can be made slightly lower.

Figure 3:
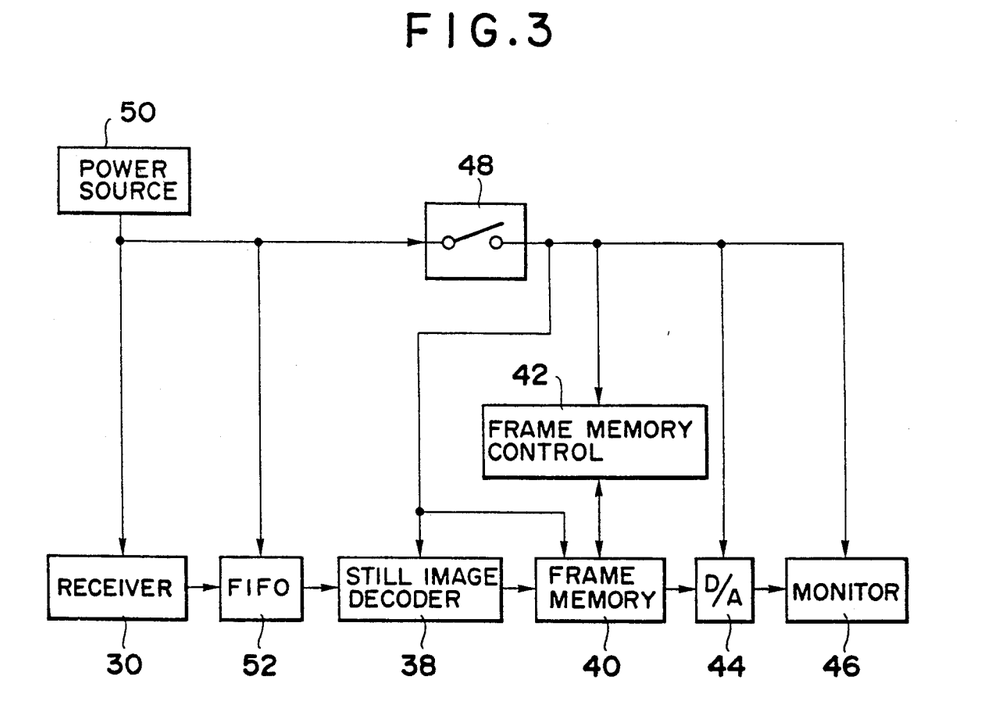
FIG. 3 is a block diagram showing the structure of another embodiment of this invention.

FIG. 3 is a block diagram showing the structure of another embodiment of this invention. Like elements to those shown in FIG. 1 are represented by using identical reference numerals. In the embodiment shown in FIG. 3, a FIFO memory 52 is used in place of the buffer memory 32. If an output from the receiver 30 satisfies one of the two conditions:

(1) the output contains no other information (voice or the like), and (2) the output contains other information only of a predetermined amount, and if the FIFO memory 52 has a capacity sufficient for storing still image information of one frame and other information (voice or the like), then the buffer memory controller 34 and header decoder 36 of complicated structure can be dispensed with.

In the embodiment shown in FIG. 3, the FIFO memory 52 sequentially discards the old data when data in excess of the capacity of the FIFO memory is inputted. The operation before and after the power source switch is turned on is the same as that described with FIG. 1.

Next, the second embodiment of this invention will be described. The structure of the second embodiment will be described with reference to FIG. 4.

Figures 4, 4A:
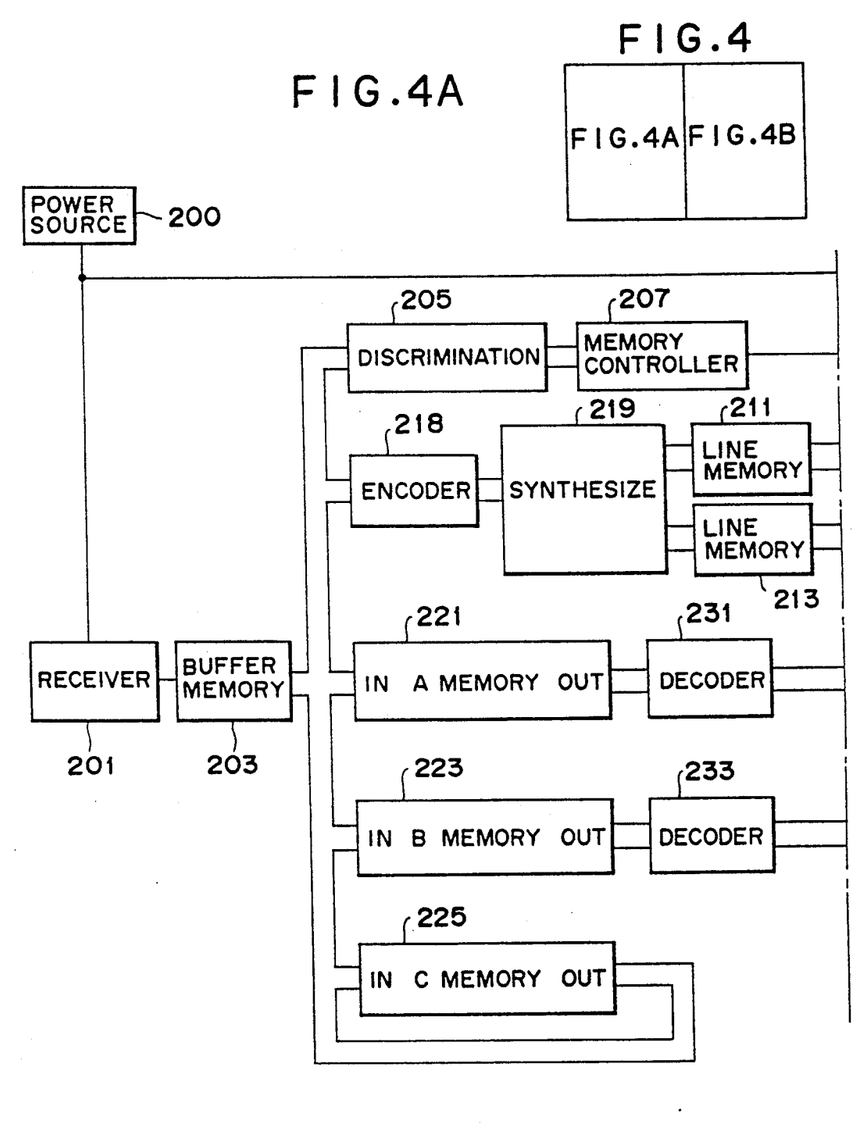
FIG. 4 (4a and 4b) is a block diagram showing the structure of a second embodiment of this invention.
Figure 4B:
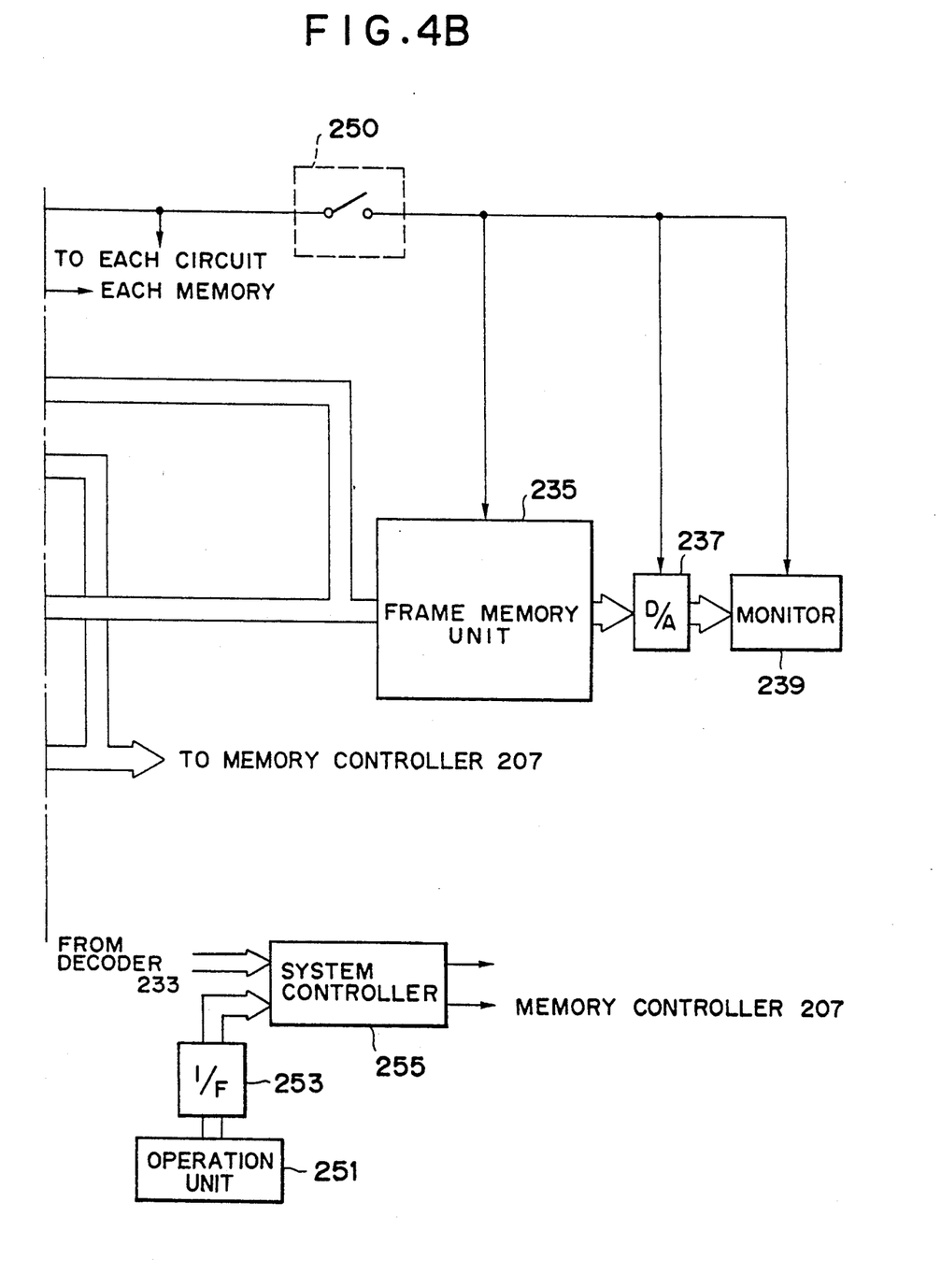

Reference numeral 200 represents a power source, 201 a receiver for receiving transmitted data, 203 a buffer memory for temporarily storing the data received by the receiver, and 205 a discriminator. This discriminator 205 discriminates if the received data stored in the buffer memory is a basic image data, an additional image data for the basic image data, or a preserved image data to be preserved for a long time, e.g., a menu image data for data to be received.

In this embodiment, the positions of the received data between the basic image data, additional image data, and preserved image data can be freely determined in accordance with settings on the transmitter side.

A memory controller 207 controls the read/write operation of a memory A 221, memory B 223, and memory C 225. Memory A 221 stores basic image data, memory B 223 stores additional image data, and memory C 225 stores preserved image data.

In this embodiment, the contents of memory C 225 are temporarily transferred to memory A 221 and displayed on a monitor 239 via a decoder 231 and area of frame memory 235.

Reference numerals 211 and 213 are buffer memories each having a capacity of 16 lines for temporarily storing data decoded by decoders 231 and 233. A synthesizing circuit 219 synthesizes the contents of the line memories 211 and 213. An output from the synthesizing circuit 219 is written in memory A 221 under control of a memory controller 207.

The decoders 231 and 233 expand the compressed data stored in memories 221 and 223. In this embodiment, data received by the receiver 201 is a data compressed by a compressing method such as ADCT.

Additional data to be transmitted is a data for changing a part of the basic image data. In this embodiment, therefore, in changing the basic image data by using the additional image data, the basic and additional image data is first decoded to restore its not-compressed state, and then synthesized by the synthesizing circuit 219.

An output of the decoder 233 is also connected to the memory controller 207. The decoder 233 decodes the data representative of the synthesizing position transmitted together with the compressed image data. In accordance with the data representative of the synthesizing position, the memory controller 207 controls the timing of reading data from memory A 221 and decoding it, and the timing of reading data from memory B 223 and decoding it.

The area memory 235 stores image data decoded by the decoder 231. A D/A converter 237 D/A-converts an output from the area memory 235. The monitor 239 displays an output from the D/A converter as a visual image.

In this embodiment, power is directly supplied to the elements 201 to 233, and is supplied via a power source switch 250 to the elements 235 to 239.

A system controller 255 controls the power source switch 250 and memory controller 207 in accordance with a display instruction inputted from a display instruction switch on an operation unit 251 via an interface I/F 253, and in accordance with the information representative of the image synthesizing position inputted from the decoder 233.

Figures 5, 5A:
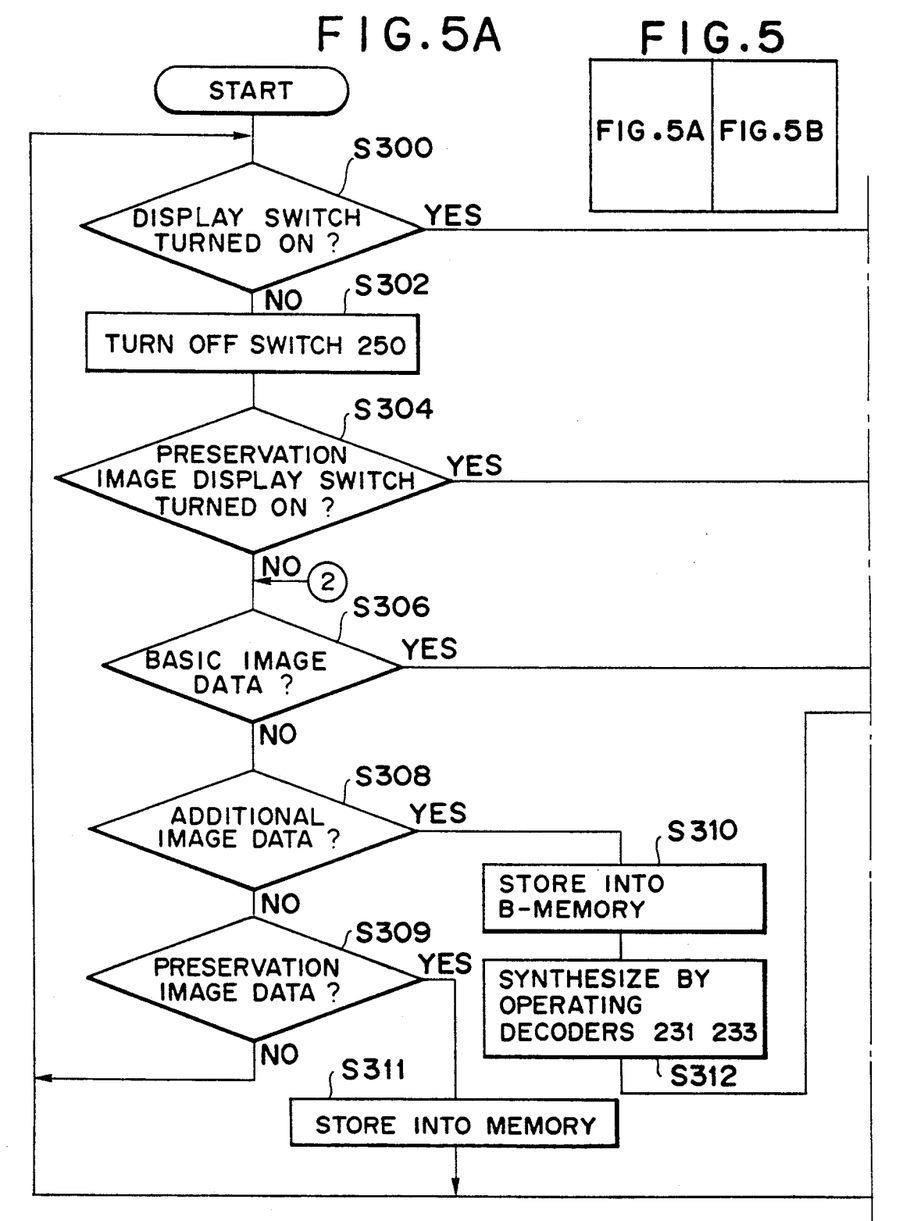
FIG. 5 (5a and 5b) is a flow chart used for illustrating the operation of the embodiment shown in FIG. 4.

Next, the operation of the embodiment constructed as above will be described with reference to FIG. 5. While the display instruction switch on the operation unit 251 is not turned on, power is supplied to the elements 201 to 233. The discriminator circuit 205 discriminates if the information received by the receiver is the basic image data, additional image data, or preserved image data. This discrimination result is sent via the system controller 255 to the memory controller 207. In accordance with the discrimination result, the memory controller 207 writes image data in a corresponding one of the memories 221, 223, and 225.

While the display instruction switch is not turned on, the flow branches from S300 to S302. When the basic image data is transmitted, the flow branches from S306 to S308 at which the basic image data is stored in memory A 221.

When the additional image data is transmitted, the flow branches from S308 to S310 at which the additional image data is temporarily stored in memory B 223. Next, the data stored in memory A 221 is decoded by the decoder 231, while the data stored in memory B 223 is decoded by the decoder 233. Two image data decoded by the decoders 231 and 233 are delayed by the line memories 211 and 213 and synthesized by the synthesizing circuit 219 (S312). The synthesized data is again compressed by an encoder 218 and written in memory A 211 (S308). This process is executed each time when the additional image data is transmitted.

After the above processes, the latest image data in a compressed state to be displayed on the monitor 239 is stored in memory A 221.

When the display instruction switch is turned on, the flow branches from S300 and the system controller 255 turns on the power source switch 250 (S322). Thus, the decoder 231 becomes active and the frame memory unit 235 is powered so that a still image is displayed on the monitor 239 via the D/A converter 237 (S324).

When the preserved image data is received by the receiver 201, the discriminator circuit 205 discriminates it and the flow branches from S308 to S309 at which the memory controller 207 is activated to write the preserved image data in memory C 225 (S311).

Under these conditions, when a preserved image display switch on the operation unit 251 is actuated, the flow branches from S304 to S332 at which under control of the system controller 225, the memory controller 207 causes the image data stored in memory A 221 to be temporarily transferred to memory B 223. Next, the preserved image data is read from memory C 225 and written in memory A 221 (S334). Next, the switch 250 is turned on (S336) to activate the frame memory 235, D/A converter 237, monitor 239, and decoder 231 to write the expanded data in the frame memory 235 and display it on the display (S338).

After the above processes, an image such as a menu image stored in memory C 225 is displayed on the monitor. Since memory C 225 is used for the storage of the preserved image data, the circuit structure can be effectively simplified.

Next, when the preserved image display switch is turned off (S340), the flow advances to S342. The preserved image data stored in memory A 221 is transferred to memory C 225, while the contents of memory B is transferred to memory A (S344), and thereafter the flow returns to S306.

In the above embodiment, in displaying the contents of memory C on the monitor, the contents are temporarily transferred to memory A. With such an arrangement, the number of decoders can be made small, with a resultant simple circuit structure.

Figures 6, 6A:
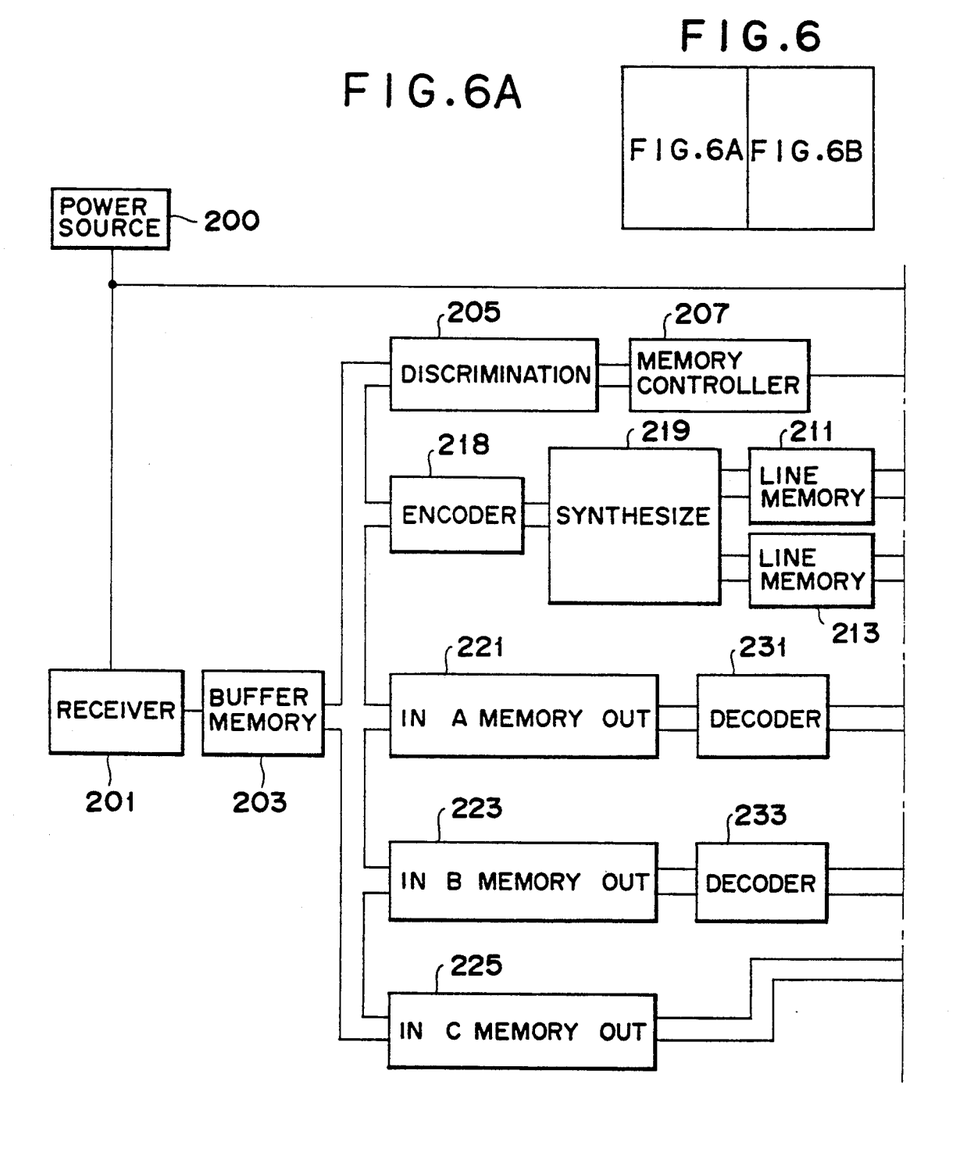
FIG. 6 (6a and 6b) is a block diagram showing a modification of the embodiment shown in FIG. 4.
Figure 6B:
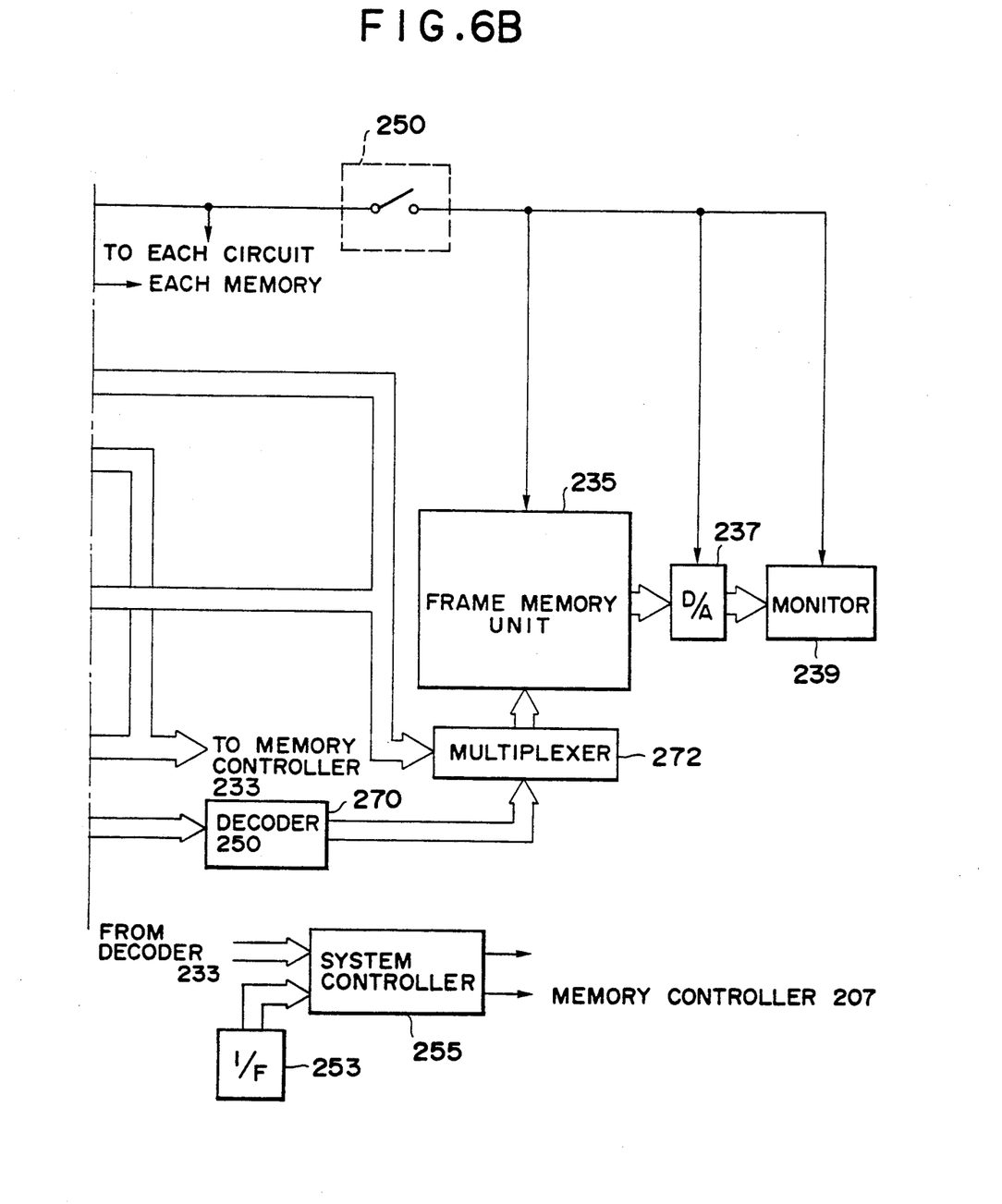

Alternatively, there may be provided decoders for all memories A, B and C as shown in FIG. 6. In this case, even if new basic image data or additional image data is received by the receiver while displaying the preserved image data stored in memory C, the contents of memories A and B can be updated at that time.

In the above embodiments, reception/reproduction processing of image data from a broadcasting satellite has been described by way of example. This invention is also applicable to not only electromagnetic wave but also reception through optical cable and reproduction from recording mediums such as optical disk, magneto-optical disk, magnetic disk and the like.

As readily appreciated from the foregoing description of the embodiments, a still image can be displayed in a very short time with small power consumption.

What is claimed is:

1. A reproducing apparatus comprising:
   a) means for receiving compressed data, said receiving means including discriminating means for discriminating that received data is image data;
   b) means for storing compressed data received by said receiving means upon discrimination by said discriminating means that received compressed data is image data;
   c) means for supplying said stored data to reproducing means for reproducing said stored data as a visual image; and
   d) means for causing said storing means to retain said compressed image data both when the supplying means is operative and when said supplying means is inoperative.

2. A reproducing apparatus according to claim 1, wherein said compressed image data is a data compressed by a compressing method using orthogonal transformation.

3. A reproducing apparatus according to claim 1, further comprising:

means for supplying power to said storing means and said supplying means independently from each other.

4. A reproducing apparatus according to claim 1, wherein said image data is a compressed still image data.

5. An image reproducing apparatus comprising:
   a) discriminating means for discriminating kinds of given image data input thereto;
   b) retaining means for retaining image data input thereto; and
   c) renewing means for selectively renewing a retaining state of said retaining means according to discrimination by said discriminating means.

6. An image reproducing apparatus according to claim 5, wherein said kinds of given image data include a basic image data, image data indicating additional image data for the basic image data nd preserved image data, and wherein said discriminating means discriminates input thereto of each of said given image data.

7. An image reproducing apparatus according to claim 5, wherein said retaining means has capability for retaining compressed image data, and wherein said renewing means temporarily expands and renews said compressed image data retained by said retaining means and further compressed the expanded and renewed image data for retention thereof by said retaining means.

8. An image reproducing apparatus according to claim 6, wherein, when said discriminating means discriminates that said given image data is data indicating basic image data, said renewing means effects renewing of image data retained by said retaining means.

9. An image reproducing apparatus according to claim 5, further comprising output means for reading out image data retained by said retaining means.

10. An image reproducing apparatus according to claim 9 further including a monitor, said output means applying the read out image data to said monitor.

11. A reproducing apparatus comprising:
    a) discriminating means for discriminating kinds of given data input thereto;
    b) retaining means for retaining data input thereto; and
    c) renewing means for selectively renewing a retaining state of said retaining means according to discrimination by said discriminating means.

12. A reproducing apparatus according to claim 11, wherein said kinds of given data include audio information or image information and wherein said discriminating means discriminates input thereto of each of said given data.

13. A reproducing apparatus according to claim 12, wherein, when said discriminating means discriminates that said given data is image information, said renewing means effects renewing of data retained by said retaining means.

14. A reproducing apparatus according to claim 13, wherein, when said discriminating means discriminates that said given data is audio information, said renewing means does not effect renewing of data retained by said retaining means.

* * * * *

UNITED STATES PATENT AND TRADEMARK OFFICE
CERTIFICATE OF CORRECTION

PATENT NO. : 5,291,306
DATED : March 1, 1994
INVENTOR(S) : Ikuo Watanabe, et al.

Figure 5B:
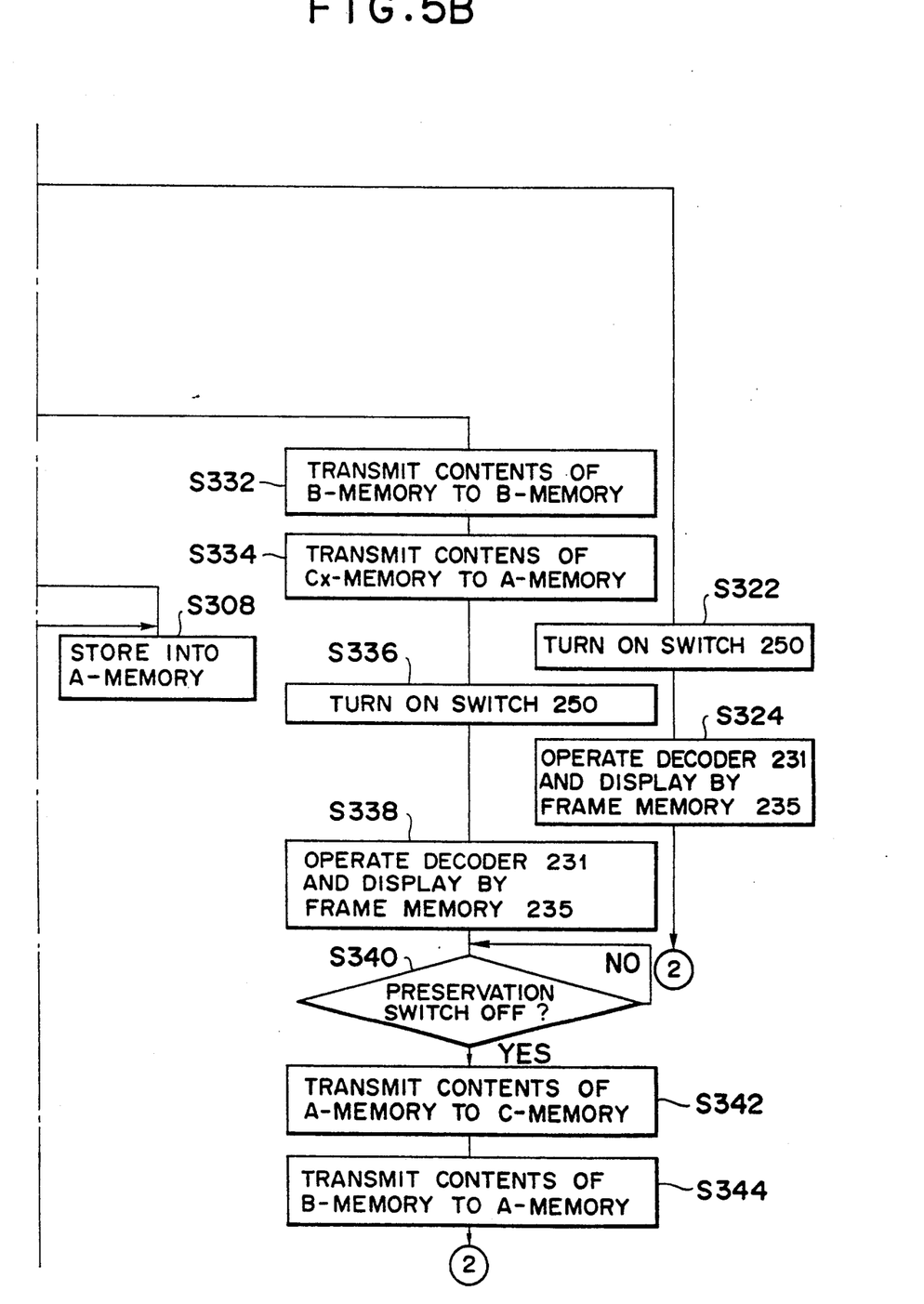

It is certified that error appears in the above-indentified patent and that said Letters Patent is hereby corrected as shown below:

Artwork, FIG. 5B, change "contens" to -- contents --.

Col. 3, line 34, change "Will" to -- will --.

Col. 3, line 53, delete "one".

Col. 3, line 63, change "the" to -- a --.

Col. 4, line 28, after "switch" insert -- which --.

Col. 5, line 56, delete "when".

Col. 6, line 40, change "to not only" to -- not only to --.

Col. 7, line 18, change "nd" to -- and --.

Col. 7, line 27, change "compressed" to -- compresses --.

Signed and Sealed this

Second Day of August, 1994

Attest:

BRUCE LEHMAN

Attesting Officer

Commissioner of Patents and Trademarks